Patented May 10, 1932

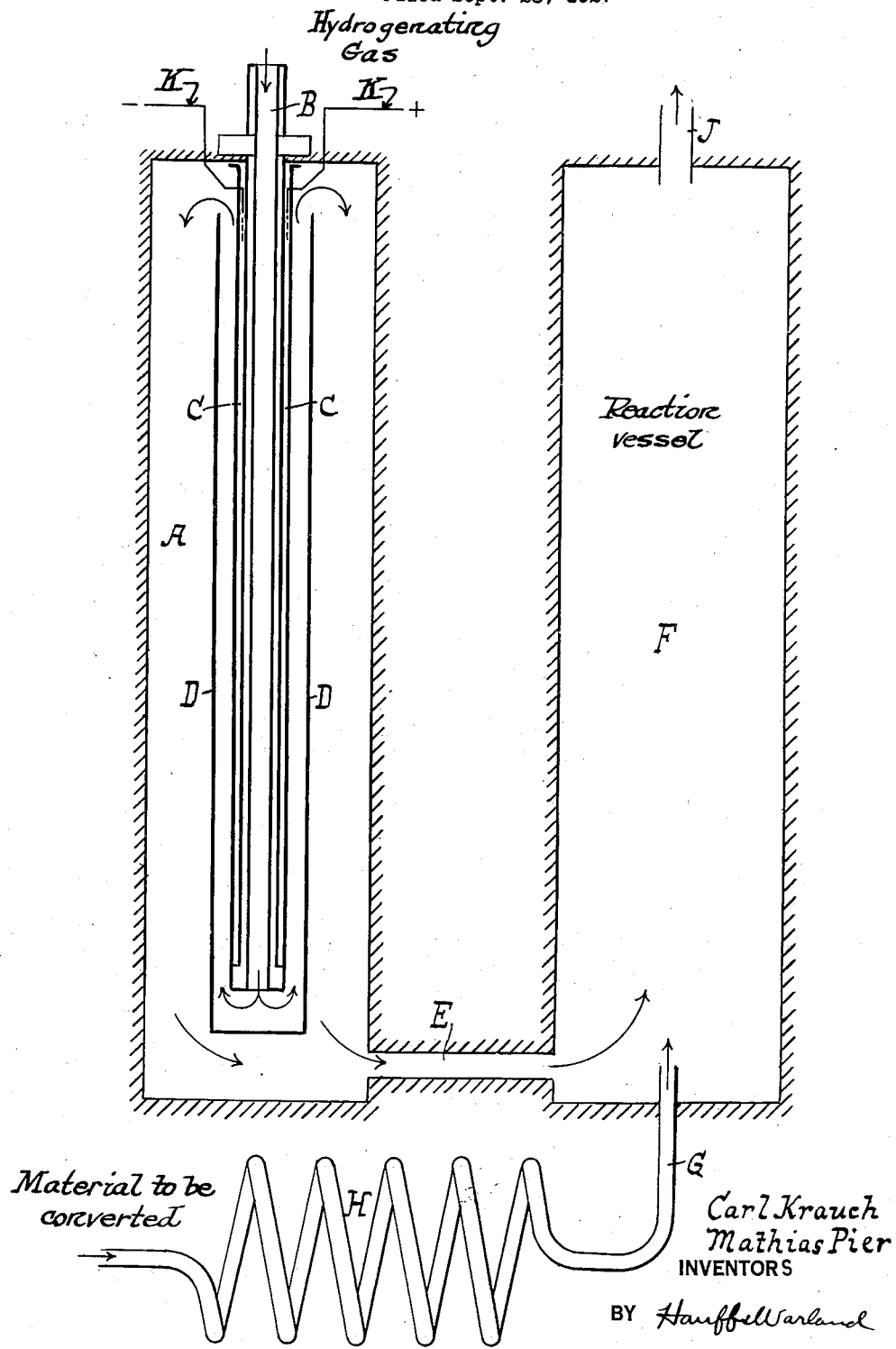

1,857,814

UNITED STATES PATENT OFFICE

CARL KRAUCH, OF LUDWIGSHAFEN-ON-THE-RHINE, AND MATHIAS PIER, OF HEIDELBERG, GERMANY, ASSIGNORS, BY MESNE ASSIGNMENTS, TO STANDARD - I. G. COMPANY, OF LINDEN, NEW JERSEY, A CORPORATION OF DELAWARE

SUPPLYING HEAT IN HIGH PRESSURE REACTIONS

Application filed September 28, 1927, Serial No. 222,679, and in Germany July 28, 1926.

The present invention relates to a method of supplying heat to the reacting materials in high pressure reactions, in which readily decomposable materials containing carbon are treated at high temperatures with gases or vapors which are less liable to decomposition by the action of high temperatures and in which reactions products are obtained having a different number of carbon atoms in the molecule than that contained in the molecule of the initial materials. In such reactions the supply of the necessary amount of heat to the reacting material and the control of the best suitable temperature affords great difficulties, especially when working on a large industrial scale.

We have now found that these difficulties can be overcome in a simple manner by not supplying the heat required for the reaction to the material to be treated through the pressure resistant walls of the reaction vessel but wholly or partially by a non-metallic gas preheated to a temperature above that required for said reaction, which gas is not decomposed at high temperatures and which may be an inert gas or may take part in the reaction and is brought into direct contact with the materials to be treated. For example such gas is passed, before it comes into contact with the materials to be treated, over or along a heating device, for example an electrically operated heater, and thereby brought to the desired temperature, care being taken that decomposable reacting materials, or materials which would attack the heating device, do not have access to the said heating device but the preheating of the said non-metallic gas must not take place through the pressure bearing walls. By this manner of working the pressure resistant wall of the reaction vessel is only very little exposed to attack by heat. Further, the heat supplied to the reacting materials is distributed much more uniformly than if the heat were supplied through the pressure resistant wall and therefore any undesirable local superheating of the materials is avoided. It is advantageous to preheat the initial materials to be treated to a temperature below that at which decomposition would occur, in any suitable manner.

The materials to be treated may be vaporized or atomized by the highly heated gas and are thereby heated and if desired brought to reaction with the said gas. The mixture of gas and reacting materials may also be passed over catalysts suitable for the desired reaction, for example those specified in the Australian Patent No. 1,217 of 1926. When the initial materials are to be treated in the liquid state, the heat supplying gas may be employed for agitating the liquid materials. The highly heated gas may be introduced into the materials to be treated for example through porous plates or the like on which the said materials rest in the liquid or solid state.

As stated above, the heat supplying gas is heated to temperatures exceeding the temperature at which the reaction is to be carried out. Of course the degree of such superheating depends on the nature of the material to be treated and should be kept as low as practicable in order to avoid undesirable decomposition of the materials. The necessary amount of heat can be supplied with only a small excess temperature by employing a gas of a high specific heat for example hydrogen in which latter case a smaller amount of superheated gas is sufficient. In any case any sudden development of heat which would lead to local superheating of the materials must rapidly be equalized.

Care should be taken that those parts of the apparatus which come into contact with the hot reacting materials and gases, are made of a material resistant to the action of these substances.

The supply of heat to the heating gas may also be effected instead of by a heating device, by an exothermic reaction; for example when working with hydrogen, oxygen may be added to burn part of the hydrogen whereby the remaining gas is strongly heated to the desired temperature.

The process according to the present invention is applicable for example in the conversion of low alcohols such as methanol or ethyl alcohol, into higher alcohols and the like by the action of carbon monoxid or water gas. However, the process is of particular importance in the destructive hydrogenation of bituminous carbonaceous materials such as the various kinds of coal, tars, mineral oils, distillation and conversion products and residues thereof and the like, that is the treatment of the said materials with hydrogen or gases containing or giving rise to hydrogen at elevated temperatures between 300° and 700° C. and under pressures of at least 50 atmospheres for the production of valuable hydrocarbons and derivatives thereof. In this treatment the hydrogen or gas supplying hydrogen is preferably used as the heating gas. As pointed out above it is advantageous to employ large amounts of hydrogen in order to avoid local superheating of the reacting material. This involves the further advantage that the hydrogenating action is increased. In the case of the destructive hydrogenation, the apparatus must be resistant to attack by hydrogen, oxygen, sulfur, hydrocarbons and the like, and those parts of it, which come into contact with hot hydrocarbons, should preferably not further the deposition of carbon and the formation of methane. When employing in this reaction an electric heating device as is most suitable, the material of such device must also be resistant to the attack of the heating gas, especially of hydrogen and also of hydrogen sulphide. Suitable materials for this purpose are for example steels containing 20 per cent of chromium, 7 per cent of nickel and 0.25 per cent of carbon or 62.3 per cent of nickel, 11.3 per cent of chromium, 2 per cent of manganese and 0.3 per cent of carbon.

The invention will be further illustrated with reference to the accompanying diagrammatic drawing which shows, in cross-section, one form of apparatus suitable for carrying out our invention, but to which the invention is not limited.

In the apparatus shown in the drawing, the gas is first passed through a heating vessel A, into which it is introduced at B through an electric heating device K arranged in the hollow spaces C. By means of a partition D the gas is led along the outer portion of the heating device K so that it is strongly heated. It is then passed through a pipe E into the reaction vessel F. The reacting materials liable to be decomposed are introduced into the reaction vessel F at G, after being preheated, if so desired, in any suitable manner in the coil H. The gases and vapors having undergone the reaction are withdrawn from the reaction vessel F at J.

*Example*

In the aforedescribed apparatus, ground crude lignite, made into a paste with an oily product boiling chiefly above 325° C. obtained by the destructive hydrogenation of lignite, is preheated in the coil H to about 380° C. and then introduced into the reaction vessel F. The hydrogenating gas containing about 90 to 95 per cent of hydrogen is passed, after being preheated in any suitable way, into the heating vessel A, in which it is further heated by the electric heating device C. It is then introduced into the reaction vessel in which it is brought into intimate contact by stirring or the like with the lignite paste at about 420° to 460° C. The resulting products chiefly of the nature of benzines and middle oils, which are vaporous at the said temperature, are withdrawn at J, whereas the ashes and unaltered brown coal together with oils of high boiling point may be withdrawn by another suitable pipe (not shown in the drawing); or all products are withdrawn together at J and subsequently separated in any suitable manner.

The electric heating device together with the gas supply may also be arranged in the reaction vessel itself, in which case the heating vessel A is dispensed with.

We claim:

1. The process for destructive hydrogenation of bituminous materials at a temperature sufficient to effect the conversion and a pressure of the order of those employed in destructive hydrogenation which comprises preheating the bituminous material to a temperature near to but below the reaction temperature and bringing the material to the reaction temperature by contacting it only with a gas consisting substantially entirely of hydrogen which is electrically preheated to a temperature not greatly exceeding the reaction temperature, while avoiding the supplying of heat to said gas through pressure bearing walls.

2. The process as defined in claim 1 wherein the hydrogen is preheated in a zone separate from the reaction zone at a pressure higher than that employed in the reaction.

3. The process as defined in claim 1 wherein the bituminous material is preheated to about 380° C. and the gas consisting substantially entirely of hydrogen is preheated to about 420 to 460° C.

In testimony whereof we have hereunto set our hands.

CARL KRAUCH.
MATHIAS PIER.

CERTIFICATE OF CORRECTION.

Patent No. 1,857,814. May 10, 1932.

CARL KRAUCH ET AL.

It is hereby certified that the name of the assignee in the heading to the printed specification of the above numbered patent was erroneously written and printed as "Standard - L. G. Company" whereas said name should have been written and printed as Standard - I. G. Company; and that the said Letters Patent should be read with this correction therein that the same may conform to the record of the case in the Patent Office.

Signed and sealed this 4th day of October, A. D. 1932.

(Seal)

M. J. Moore,
Acting Commissioner of Patents.